United States Patent
Klingmann et al.

(10) Patent No.: US 9,156,023 B2
(45) Date of Patent: Oct. 13, 2015

(54) PALLADIUM—RHODIUM SINGLE-LAYER CATALYST

(75) Inventors: Raoul Klingmann, Alzenau (DE); Martin Roesch, Rodgau (DE); Dieter Linder, Hanau (DE); Joerg-Michael Richter, Frankfurt a.M. (DE)

(73) Assignee: UMICORE AG & CO. KG, Hanau-Wolfgang (DE)

( * ) Notice: Subject to any disclaimer, the term of this patent is extended or adjusted under 35 U.S.C. 154(b) by 1261 days.

(21) Appl. No.: 12/530,586

(22) PCT Filed: Feb. 23, 2008

(86) PCT No.: PCT/EP2008/001450
§ 371 (c)(1), (2), (4) Date: Feb. 3, 2010

(87) PCT Pub. No.: WO2008/113457
PCT Pub. Date: Sep. 25, 2008

(65) Prior Publication Data
US 2010/0126154 A1 May 27, 2010

(30) Foreign Application Priority Data
Mar. 19, 2007 (EP) .................................. 07005548

(51) Int. Cl.
*B01J 23/44* (2006.01)
*B01D 53/94* (2006.01)
(Continued)

(52) U.S. Cl.
CPC .............. *B01J 23/44* (2013.01); *B01D 53/945* (2013.01); *B01J 21/066* (2013.01); *B01J 23/464* (2013.01); *B01J 23/63* (2013.01); *B01J 35/04* (2013.01); *B01J 37/0201* (2013.01);
(Continued)

(58) Field of Classification Search
USPC ......... 502/302–304, 325, 332–334, 336, 338, 502/339, 341
See application file for complete search history.

(56) References Cited

U.S. PATENT DOCUMENTS 5,212,142 A 5/1993 Dettling
5,597,771 A 1/1997 Hu et al.
(Continued)

FOREIGN PATENT DOCUMENTS

EP 0875290 A1 11/1998
EP 0885650 A2 12/1998
(Continued)

OTHER PUBLICATIONS

Internatioanl Search Report issued in priority international application No. PCT/EP2008/001450 filed on Feb. 23, 2008.
(Continued)

*Primary Examiner* — Kaj K Olsen
*Assistant Examiner* — Pritesh Darji
(74) *Attorney, Agent, or Firm* — Smith, Gambrell & Russell, LLP

(57) ABSTRACT

A one-layer three-way catalyst is described for the cleaning of the exhaust gases of internal combustion engines with outstanding activity and thermal stability. The catalyst comprises an active aluminum oxide, a first cerium/zirconium mixed oxide and a second cerium/zirconium mixed oxide. The first cerium/zirconium mixed oxide has a higher zirconium oxide content than the second mixed oxide. The first cerium/zirconium mixed oxide is catalytically activated with rhodium and the second cerium/zirconium mixed oxide with palladium.

19 Claims, 2 Drawing Sheets

(51) Int. Cl.
  *B01J 21/06*  (2006.01)
  *B01J 23/46*  (2006.01)
  *B01J 23/63*  (2006.01)
  *B01J 35/04*  (2006.01)
  *B01J 37/02*  (2006.01)

(52) U.S. Cl.
  CPC .... *B01J 37/0215* (2013.01); *B01D 2255/1023* (2013.01); *B01D 2255/1025* (2013.01); *B01D 2255/407* (2013.01); *Y02T 10/22* (2013.01)

(56) References Cited

U.S. PATENT DOCUMENTS

| | | | |
|---|---|---|---|
| 6,080,375 | A | 6/2000 | Mussmann et al. |
| 7,998,896 | B2 | 8/2011 | Kitamura |
| 2003/0180197 | A1 | 9/2003 | Nunan |
| 2004/0198595 | A1* | 10/2004 | Chen .................... 502/328 |
| 2007/0093381 | A1* | 4/2007 | Miyoshi et al. ........... 502/304 |

FOREIGN PATENT DOCUMENTS

| | | |
|---|---|---|
| EP | 1046423 A2 | 10/2000 |
| EP | 1138382 A1 | 10/2001 |
| EP | 1541220 A1 | 6/2005 |
| JP | 200738072 A | 2/2007 |
| WO | WO 9535152 A1 * | 12/1995 ............ B01D 53/94 |
| WO | WO 98/09726 | 3/1998 |

OTHER PUBLICATIONS

PCT Notification of Transmittal of Translation of International Preliminary Report (Form PCT/IB/338) for PCT/EP2008/001450 mailed Nov. 19, 2009 (in English language).

PCT International Preliminary Report on Patentability (Form PCT/IB/373) for PCT/EP2008/001450 dated Nov. 10, 2009 (in English language).

PCT Written Opinion of the International Searching Authority (Form/ISA/237) for PCT/EP2008/001450 dated Nov. 10, 2009 (in English language).

* cited by examiner

PALLADIUM—RHODIUM SINGLE-LAYER CATALYST

This application claims the benefit of International Application PCT/EP2008/001450 filed Feb. 23, 2008 and EP Application 07005548.8 filed Mar. 19, 2007 which are relied on and incorporated herein by reference.

INTRODUCTION AND BACKGROUND

The invention relates to a three-way catalyst with outstanding catalytic activity and aging stability for the cleaning of the exhaust gases of internal combustion engines.

Three-way catalysts are used in large numbers for the cleaning of the exhaust gases of internal combustion engines operated under essentially stoichiometric conditions. They are capable of converting the three significant pollutants from the engine, specifically hydrocarbons, carbon monoxide and nitrogen oxides, simultaneously to harmless components. Frequently, double-layer catalysts are used, which enable a separation of different catalytic procedures and hence an optimal balance of the catalytic effects in the two layers. Catalysts of this kind are described, for example, in EP 0 885 650 and EP 1 046 423.

Double-layer catalysts have the disadvantage that their production is more expensive than that of single-layer catalysts. Moreover, double-layer catalysts have a tendency to an increased exhaust gas backpressure compared to single-layer catalysts, which is at the expense of the performance of the internal combustion engines and the fuel consumption thereof. There have therefore always been efforts to obtain the good catalytic properties of double-layer catalysts by means of single-layer catalysts, as far as possible without tradeoffs. Single-layer three-way catalysts are known, for example, from WO 98/09726, EP 1 138 382 and EP 1 541 220.

The constantly rising demands on reducing the emissions of internal combustion engines necessitate constant further development of the catalysts with regard to catalytic activity, aging stability and production costs. It was therefore an object of this invention to provide a catalyst which has further-reduced lightoff temperatures and improved thermal stability coupled with lower production costs compared to the prior art catalysts.

SUMMARY OF THE INVENTION

This object is achieved by a catalyst according to the claims. The catalyst has a single catalytically active coating on an inert catalyst support of ceramic or metal. The catalyst is characterized in that it comprises an active aluminum oxide and a first and a second cerium/zirconium mixed oxide, the first cerium/zirconium mixed oxide being activated with rhodium and having a higher zirconium oxide content than the second cerium/zirconium mixed oxide which is catalytically activated with palladium.

In the context of the present invention, the wording "a support material is activated with a catalytically active element" means that the catalytically active element has been deposited in highly disperse form on the surface of the support material accessible by impregnation.

By virtue of the combination of the properties mentioned, the catalyst has very good lightoff performance and possesses a high thermal stability. Moreover, the catalyst has a low exhaust gas backpressure and the production costs thereof are lower than those of a corresponding double-layer catalyst.

The active aluminum oxide and the cerium/zirconium mixed oxides are introduced into the coating as pulverulent solids. The thermal stability of both mixed oxides can be improved by stabilizing them with at least one oxide of the elements selected from the group consisting of iron, manganese, tin, titanium, silicon, yttrium, lanthanum, praseodymium, neodymium, samarium and mixtures thereof. The amount of the doping elements, calculated as the oxide, is preferably between 1 and 15 and especially between 5 and 10% by weight, based on the total weight of the stabilized mixed oxide.

The first cerium/zirconium mixed oxide preferably has a weight ratio of cerium oxide to zirconium oxide of 0.5 to 0.1, and the second cerium/zirconium mixed oxide preferably has a weight ratio of cerium oxide to zirconium oxide of 0.8 to 1.2. The specific surface area of these materials is advantageously within a range between 50 and 100 $m^2/g$.

The active aluminum oxide may be stabilized with 1 to 10% by weight of lanthanum oxide, based on the total weight of aluminum oxide plus lanthanum oxide. A further improvement in the thermal stability of the catalyst can be achieved when active aluminum oxide and the cerium/zirconium mixed oxides are additionally impregnated with strontium oxide and/or barium oxide.

Usually, the catalyst support is a honeycomb with a volume V, which has parallel flow channels for the exhaust gases of the internal combustion engine, the wall surfaces of the flow channels being coated with the catalyst and the concentration of the palladium based on the volume of the honeycomb being between 0.1 and 10 g and the concentration of the rhodium between 0.01 and 1 g. In a particular embodiment of the catalyst, the first cerium/zirconium mixed oxide may also be catalytically activated with palladium in addition to rhodium. In a further embodiment, both cerium/zirconium mixed oxides may also be activated with platinum.

The noble metal concentrations which should actually be employed depend on the desired pollutant conversions. The highest concentration values reported here are required to comply with the strict emissions standards for SULEVs (SULEV=Super Ultra-Low Emission Vehicles).

To coat the catalyst support with the catalytically active layer, it is necessary to prepare a coating suspension which comprises all constituents of the desired catalytic layer either directly or in the form of precursors thereof which are converted to their ultimate form by the final calcination of the coating.

The two cerium/zirconium mixed oxides can be coated separately with precursor compounds of rhodium or palladium by known impregnation processes. Preference is given to using the water-soluble compounds rhodium nitrate and palladium nitrate. The materials thus precoated can then be suspended in water together with aluminum oxide. The suspension is ground in wet form until the solids of the suspension have a mean particle size of about 3 to 5 μm. Thereafter, the honeycombs are coated with this suspension by known methods, dried and calcined. This production process guarantees that palladium and rhodium are deposited separately on different support materials.

In a preferred embodiment of the invention, the first cerium/zirconium mixed oxide is first suspended in water. A solution of a precursor compound of rhodium, preferably rhodium nitrate, is added to this suspension. Thereafter, the pH of the suspension is raised to a value of about 6 with a base, for example tetraethylammonium hydroxide (TEAH), in order to precipitate the rhodium nitrate. Subsequently, the second cerium/zirconium mixed oxide is suspended in the suspension and a solution of a precursor compound of palladium is added. This lowers the pH of the suspension into the strongly acidic range. Further addition of a base raises the pH back to about 6 and thus precipitates the palladium onto both mixed oxides. Thereafter, aluminum oxide is added to the suspension and the suspension is finally, as already described, ground and applied to the catalyst support body. The catalyst thus prepared does not contain any alkaline earth metals.

Alternatively, a basic solution of barium hydroxide and/or strontium oxide can first be initially charged. The first cerium/zirconium mixed oxide is added to this solution and suspended in the solution. Thereafter, a solution of rhodium nitrate, for example, is added to the suspension, which precipitates the rhodium onto the first cerium/zirconium mixed oxide owing to the basicity of the suspension. Thereafter, the second cerium/zirconium mixed oxide is supplied to the suspension, followed by a palladium nitrate solution. Finally, aluminum oxide is added to the suspension and the suspension, as already described, is ground and applied to the catalyst support body. Use of barium hydroxide or strontium hydroxide as the base for the precipitation of rhodium nitrate causes barium oxide or strontium oxide to remain in the coating after the final calcination.

In the catalysts manufactured according to the last two production variants, both rhodium and palladium are present on the particles of the first cerium/zirconium mixed oxide.

BRIEF DESCRIPTION OF DRAWING

The invention is illustrated in detail hereinafter with reference to the examples and the figures. The figures show.

DETAILED DESCRIPTION OF INVENTION

COMPARATIVE EXAMPLE

Figure 1:
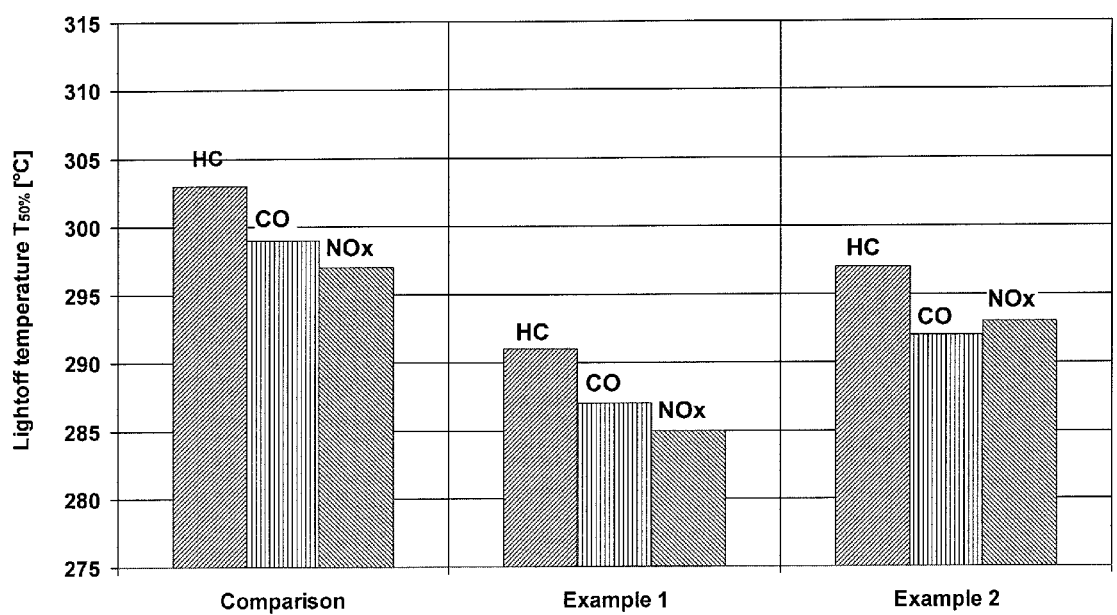
FIG. 1: Comparison of the lightoff temperatures of a prior art catalyst with catalysts according to different embodiments

A catalyst according to EP 1 541 220 was prepared. To this end, a suspension of barium sulfate in water was first prepared. 1% by weight nitric acid was added to this suspension and the pH was thus lowered to about 5. Thereafter, a γ-aluminum oxide stabilized with 3% by weight of lanthanum oxide was added, followed by a cerium/zirconium mixed oxide with a zirconium oxide content of 50% by weight, and the pH was kept approximately constant by means of nitric acid during the addition. After the addition of 10% by weight of sucrose, the suspension was ground, and then palladium nitrate and rhodium nitrate were added. After a maturing time of one hour, a cordierite honeycomb was coated with the suspension, dried and calcined. The honeycomb had a cell density of 93 cm$^{-2}$, a diameter of 14.4 cm and a length of 10.2 cm. The finished catalyst contained the following amounts of coating:

| 80 g/l | of lanthanum-stabilized aluminum oxide |
| 75 g/l | of cerium/zirconium mixed oxide (70% by weight of zirconium oxide) |
| 0.18 g/l | of rhodium (on all solid components) |
| 0.88 g/l | of palladium (on all solid components) |

Example 1

An inventive catalyst was prepared as follows:

A zirconium-rich cerium/zirconium mixed oxide (70% by weight of zirconium oxide) was suspended in water, and then rhodium nitrate was stirred into the suspension. TEAH was used to raise the pH of the suspension back to a value of about 6. Thereafter, a cerium/zirconium oxide with 50% by weight of zirconium oxide was added to the suspension, and palladium nitrate was stirred into the suspension. The pH was raised to 6 again with TEAH, before a γ-aluminum oxide stabilized with 3% by weight of lanthanum oxide was added to the suspension. Subsequently, the suspension was ground and a honeycomb was coated therewith as in the comparative example, dried and calcined. The finished catalyst contained the following amounts of coating:

| 80 g/l | of lanthanum-stabilized aluminum oxide |
| 35 g/l | of first cerium/zirconium mixed oxide (70% by weight of zirconium oxide) |
| 40 g/l | of second cerium/zirconium mixed oxide (50% by weight of zirconium oxide) |
| 0.18 g/l | of rhodium (on first cerium/zirconium mixed oxide) |
| 0.88 g/l | of palladium (on first and second cerium/zirconium mixed oxide) |

Example 2

A further inventive catalyst was prepared as follows:

Barium hydroxide was dissolved in water. The cerium/zirconium mixed oxide with 70% by weight of zirconium oxide was suspended in this solution, and rhodium nitrate was added to the suspension. Thereafter, the cerium/zirconium oxide with 50% by weight of zirconium oxide was dispersed in the suspension, and palladium nitrate was stirred into the suspension. After the addition of the aluminum oxide, the pH was adjusted to the value of 6 with acetic acid. Finally, the suspension was ground and a honeycomb was coated therewith, dried and calcined as in the comparative example. The finished catalyst contained the following amounts of coating:

| 80 g/l | of lanthanum-stabilized aluminum oxide |
| 2 g/l | of barium oxide |
| 35 g/l | of first cerium/zirconium mixed oxide (70% by weight of zirconium oxide) |
| 40 g/l | of second cerium/zirconium mixed oxide (50% by weight of zirconium oxide) |
| 0.18 g/l | of rhodium (on first cerium/zirconium mixed oxide) |
| 0.88 g/l | of palladium (on first and second cerium/zirconium mixed oxide) |

Testing of the Catalysts

Before the testing, all catalysts were exposed to hydrothermal aging in a furnace at a temperature of 985° C. for the duration of 16 hours.

After the aging, the catalysts were examined on an engine test bench with regard to lightoff temperatures and maximum conversions.

Figure 2:
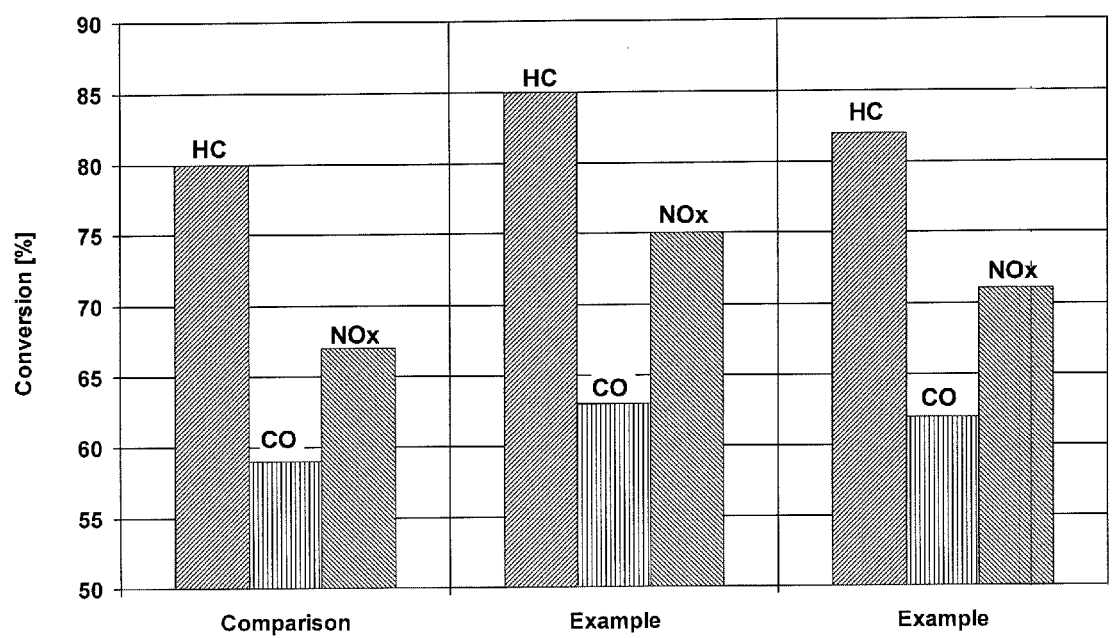
FIG. 2: Maximum conversions of the catalysts of FIG. 1

FIG. 1 shows the comparison of the lightoff temperatures. The two inventive catalysts have, after aging, significantly lower lightoff temperatures for the conversion of the HC (hydrocarbon), CO (carbon monoxide) and NOx (nitrogen oxide) pollutants than the comparative catalyst. The diagram of FIG. 2 shows the maximum conversions achieved with the catalysts.

The catalysts had a backpressure of 18.3 mbar at a gas temperature of 30° C. and an air mass flow of 345 kg/h. This backpressure is about 15% below the backpressure of a comparable double-layer catalyst.

The invention claimed is:

1. A three-way catalyst consisting of a single catalytically active layer on an inert catalyst support of ceramic or metal for the cleaning of the exhaust gases of internal combustion engines, said layer comprises
   an active aluminum oxide and
   a first cerium/zirconium mixed oxide being catalytically activated with rhodium and
   a second cerium/zirconium mixed oxide being catalytically activated with palladium and substantially free of rhodium,
   wherein the first cerium/zirconium mixed oxide has a higher zirconium oxide content than that of the second cerium/zirconium mixed oxide.

2. The three-way catalyst as claimed in claim 1, wherein the aluminum oxide and the first and second cerium/zirconium mixed oxides are additionally surface coated with strontium oxide or barium oxide.

3. The three-way catalyst as claimed in claim 1, wherein the first and second cerium/zirconium mixed oxides are each stabilized with 1 to 15% by weight rare earth oxides, based on the total weight of the mixed oxides, the rare earth oxides in each case being selected from the group consisting of iron, manganese, tin, titanium, silicon, yttrium, lanthanum, praseodymium, neodymium, samarium and mixtures thereof.

4. The three-way catalyst as claimed in claim 3, wherein the first cerium/zirconium mixed oxide has a weight ratio of cerium oxide to zirconium oxide of 0.5 to 0.1 and the second cerium/zirconium mixed oxide has a weight ratio of cerium oxide to zirconium oxide of 0.8 to 1.2.

5. The three-way catalyst as claimed in claim 4, wherein the active aluminum oxide is stabilized with 1 to 10% by weight of lanthanum oxide, based on the total weight of the aluminum oxide.

6. The three-way catalyst as claimed in claim 1, wherein the catalyst support is a honeycomb with a volume V, which has parallel flow channels for the exhaust gases of the internal combustion engine, the wall surfaces of the flow channels being coated with the three-way catalyst and the concentration of the palladium based on the volume of the honeycomb being between 0.1 and 10 g, and the concentration of the rhodium between 0.01 and 1 g.

7. The three-way catalyst as claimed in claim 6, wherein the first cerium/zirconium mixed oxide is also catalytically activated with palladium in addition to rhodium.

8. The three-way catalyst as claimed in claim 7, wherein the first and second cerium/zirconium mixed oxides are also catalytically activated with platinum in addition to palladium.

9. A process for cleaning exhaust gases from a gasoline engine comprising passing said gas in contact with the catalyst according to claim 1 as a close-coupled starter catalyst or as an underfloor main catalyst of a motor vehicle equipped with said gasoline engine.

10. The three-way catalyst of claim 1, wherein the cerium oxide content is equal to or less than the zirconium oxide content for both the first cerium/zirconium mixed oxide and the second cerium/zirconium mixed oxide.

11. A three-way catalyst consisting of a single catalytically active layer on an inert catalyst support of ceramic or metal for the cleaning of the exhaust gases of internal combustion engines, said layer comprises
    an active aluminum oxide and
    a first cerium/zirconium mixed oxide being catalytically activated with rhodium and
    a second cerium/zirconium mixed oxide being catalytically activated with palladium, wherein the second cerium/zirconium mixed oxide does not contain rhodium, and wherein the first cerium/zirconium mixed oxide has a higher zirconium oxide content than that of the second cerium/zirconium mixed oxide.

12. The three-way catalyst as claimed in claim 11, wherein the aluminum oxide and the first and second cerium/zirconium mixed oxides are additionally surface coated with strontium oxide or barium oxide.

13. The three-way catalyst as claimed in claim 11, wherein the first and second cerium/zirconium mixed oxides are each stabilized with 1 to 15% by weight rare earth oxides, based on the total weight of the mixed oxides, the rare earth oxides in each case being selected from the group consisting of iron, manganese, tin, titanium, silicon, yttrium, lanthanum, praseodymium, neodymium, samarium and mixtures thereof.

14. The three-way catalyst as claimed in claim 13, wherein the first cerium/zirconium mixed oxide has a weight ratio of cerium oxide to zirconium oxide of 0.5 to 0.1 and the second cerium/zirconium mixed oxide has a weight ratio of cerium oxide to zirconium oxide of 0.8 to 1.2.

15. The three-way catalyst as claimed in claim 14, wherein the active aluminum oxide is stabilized with 1 to 10% by weight of lanthanum oxide, based on the total weight of the aluminum oxide.

16. The three-way catalyst as claimed in claim 11, wherein the catalyst support is a honeycomb with a volume V, which has parallel flow channels for the exhaust gases of the internal combustion engine, the wall surfaces of the flow channels being coated with the three-way catalyst and the concentration of the palladium based on the volume of the honeycomb being between 0.1 and 10 g, and the concentration of the rhodium between 0.01 and 1 g.

17. The three-way catalyst as claimed in claim 16, wherein the first cerium/zirconium mixed oxide is also catalytically activated with palladium in addition to rhodium.

18. The three-way catalyst as claimed in claim 17, wherein the first and second cerium/zirconium mixed oxides are also catalytically activated with platinum in addition to palladium.

19. The three-way catalyst of claim 11, wherein the cerium oxide content is equal to or less than the zirconium oxide content for both the first cerium/zirconium mixed oxide and the second cerium/zirconium mixed oxide.

* * * * *